United States Patent [19]

Schwab

[11] Patent Number: 5,450,247

[45] Date of Patent: Sep. 12, 1995

[54] SIMULTANEOUS CONTACT DUPLICATION OF A PLURALITY OF MAGNETIC COPY TAPES FROM A SINGLE MAGNETIC MASTER TAPE

[75] Inventor: Barry H. Schwab, West Bloomfield, Mich.

[73] Assignee: Future Network, Inc., Mahwah, N.J.

[21] Appl. No.: 972,950

[22] Filed: Nov. 6, 1992

[51] Int. Cl.⁶ .................................................. G11B 5/86
[52] U.S. Cl. ........................................ 360/17; 360/16
[58] Field of Search .................................. 360/15–17, 360/31; 369/84; 242/324, 330

[56] References Cited

U.S. PATENT DOCUMENTS

| | | | |
|---|---|---|---|
| 2,738,383 | 3/1956 | Herr et al. | 179/100.2 |
| 3,633,807 | 1/1972 | Williams | 226/97 |
| 3,893,167 | 7/1975 | Stahler | 360/16 |
| 4,543,618 | 9/1985 | Sato | 364/15 |
| 4,698,700 | 10/1987 | Shirai | 360/16 |
| 4,746,991 | 5/1988 | Efron et al. | 360/31 X |
| 4,752,842 | 6/1988 | Onagiri | 360/74.1 |
| 4,768,107 | 8/1988 | Kobayashi et al. | 360/17 |
| 4,814,899 | 3/1989 | Gantzhorn, Jr. et al. | 360/16 |
| 4,819,102 | 4/1989 | Shirai et al. | 360/17 |
| 4,843,487 | 6/1989 | Gantzhorn, Jr. et al. | 360/17 |
| 4,860,126 | 8/1989 | Sota | 360/16 |
| 4,868,688 | 9/1989 | Nagaoka et al. | 360/16 |
| 4,882,636 | 11/1989 | Billings et al. | 360/16 |
| 4,974,100 | 11/1990 | Odaka et al. | 360/15 X |
| 4,979,691 | 12/1990 | Kobayashi | 242/75.51 |
| 5,095,390 | 3/1992 | Nagaoka et al. | 360/16 |

OTHER PUBLICATIONS

"Contact Duplication of Transverse Video Tape Recordings", Daniel D. Esterly, SMPTE Journal, vol. 79, No. 10, Oct. 1970.

Primary Examiner—Andrew L. Sniezek
Attorney, Agent, or Firm—Gifford, Krass

[57] ABSTRACT

In a high speed magnetic tape duplicating system, a single master tape is wound around a transfer drum rotatable about a fixed axis. Longitudinal sections of two copy tapes are preferably urged against different sections of the master tape as it contacts the transfer drum using an air clamp, and a bias field magnetic transfer heads are used to carry out anhysteretic transfer from the master to the copy tapes. The transfer heads, mounted on translatable deck plates, may be retracted away from the transfer drum along with the master and copy tapes to facilitate threading, rewinding the master tape, and automatic transfer drum cleaning with a plurality of rollers. The method of the invention includes steps whereby the master tape may be automatically threaded to accommodate both shuttle and bin-loop modes of operation, and to detect damage to the master tape and halt further manufacturing operation of the duplicating system.

25 Claims, 10 Drawing Sheets

SIMULTANEOUS CONTACT DUPLICATION OF A PLURALITY OF MAGNETIC COPY TAPES FROM A SINGLE MAGNETIC MASTER TAPE

FIELD OF THE INVENTION

The present invention relates to a method and apparatus for duplicating magnetic tapes at high speed, and, in particular, to an apparatus wherein more than one copy tape can be produced simultaneously from a single master automatically threaded for either shuttle or bin-loop modes of operation.

BACKGROUND OF THE INVENTION

The meteoric rise in the popularity of home video players has created a tremendous need for high-throughput duplication of the magnetic tapes utilized by such players. Presently there are two general approaches to the volume duplication of video tapes, the first being real-time duplication wherein a plurality of copy tapes are recorded using program material read from a master, and contact printing wherein a copy tape is pressed against a master tape and a technique is used to transfer the program material from the master to the copy at the point where the two tapes overlap.

At present there are two practical contact methods in use for high speed magnetic tape duplication. The first, thermal duplication, disclosed in Billings et al, U.S. Pat. No. 4,882,636 demagnetizes the copy tape by elevating its temperature beyond its Curie point when in contact with the master so that it becomes remagnetized in accordance with the pattern recorded on the master as it cools. To ensure that the contents of the master tape are not degraded by the elevated temperature, the thermal process requires the use of a high Curie temperature, high coercivity metal-particle tape as the master tape, and $CrO_2$ tape, as the copy tape.

The other practical form of high speed magnetic tape duplication, as disclosed in Nagaoka, et al, U.S. Pat. No. 5,095,390 utilizes the property of anhysteresis wherein a copy tape exhibiting a magnetic coercivity relatively less than that of the master tape is pressed against the master in the presence of a bias magnetic field causing the copy tape to demagnetize and realign in accordance with the master as the two pass by the head supplying the bias field.

Because these prior art duplication systems move the drum against a fixed transfer head, they only allow one copy tape to be duplicated from the master tape at any given time.

Additionally, the prior art systems only allow the master tape to operate in "shuttle mode" or "bin-loop" mode, but do not have the capability for both modes in a single duplicating apparatus. In shuttle mode, the master tape is unwound from a supply reel and collected onto a take-up reel during duplication, and rewound in between duplication cycles. In the bin-loop mode, the two ends of the master tape are spliced to form a continuous loop, with excess tape not actively involved in the transfer process being held in a containment bin.

SUMMARY OF THE PRESENT INVENTION

The present invention overcomes these disadvantages of the prior art systems by allowing the duplication of a plurality of tapes simultaneously and allowing both shuttle and bin-loop modes of operation in a single machine, and further includes a method for automatically threading the master tape for either the shuttle or bin-loop modes.

In accordance with the present invention an apparatus and method are provided to produce a plurality of magnetic copy tapes simultaneously from a magnetic master tape. The apparatus of the present invention comprises a transfer drum rotatable about a fixed axis, and a deck plate associated with each copy tape. Each deck plate in turn comprises a transfer head, a plurality of master tape guides, a plurality of copy tape guides and an air clamp. The deck plates are translatable along a line extending radially outward from the transfer drum between a retracted position wherein said master and said copy tapes are held spaced apart and away from the transfer drum by the tape guides, and a run position wherein an air clamp is used to urge a longitudinal section of the copy tape against a longitudinal section of the master tape and to urge both of these overlapping tape sections against a portion of the circumferential surface of the transfer drum. As the transfer drum rotates, it pulls the master tape and the copy tapes overlapping thereupon across the transfer head associated with each deck plate. A copy tape transport mechanism associated with each copy tape is provided by the present invention to supply copy tape as needed by the transfer process and to collect the tapes thereafter. A master tape transport mechanism is also provided, the master tape transport being operative in either a shuttle mode wherein the master is shuttled between a supply reel and a take-up reel during the transfer operation or a bin-loop mode wherein the transfer is provided as a endless loop and cycled through a containment bin when not actively being duplicated. In the preferred embodiment, the plane of the deck plates and the plane of the containment bin are coplanar, but alternatively, they could be at angles to one another, such as perpendicular.

The preferred embodiment of the present invention further includes a transfer-drum cleaner comprising two or more rollers with absorbent surfaces, each being movable between a retracted position when the deck plates are in run position; when the deck plates are retracted, the rollers are movable to a cleaning position wherein the circumferential surface of each is urged against a different portion of the transfer drum and rotated in the same direction as the transfer drum, so that the direction of each roller is opposite to that of the transfer drum along the lines where the rollers and drum meet. Preferably one of the rollers may be moistened with a cleaning solution, in which case remaining rollers will serve to dry the drum.

One aspect of the present invention includes a method of automatic threading of the master tape for either shuttle or bin-loop modes of operation. For shuttle mode, the master is provided as a mirror master tape with beginning and end tones on a take-up reel, and a master transport leader is provided on a supply reel. The transport leader is manually threaded through the apparatus, past the transfer heads, and spliced onto the tail end of the mirror master tape. The leader, with master spliced thereto, is rewound through the apparatus and onto the supply reel until the begin tone is sensed on the supply side of the apparatus. If bin loop mode is not to be utilized, automatic threading is complete and the master tape may be shuttled back and forth between the supply reel and the take-up reel.

However, if bin load threading is required, additional steps are added after the master has been wound onto the supply reel. At this point, a bin leader tape, provided on a bin leader reel, is manually threaded through the containment bin, through the duplicating apparatus in a direction opposite to that used to thread the transport leader, and spliced to the start end of the master tape, now available on the supply reel. Next, a capstan/pinch roller on the take-up side of the apparatus is used to draw the bin leader tape with master spliced thereto back through the apparatus and into the containment bin until the end tone of the master tape is sensed. The bin leader is then rewound onto the bin reel, until the front tone of the master is sensed, at which point the front and tail ends of the master are spliced, forming a continuous loop.

The unthreading operation, when the master must be replaced, essentially reverses the loading process and leaves the leader tapes properly positioned for the next master.

Other objects, advantages and applications of the present invention will be clarified by the following detailed description of a preferred embodiment of the invention, which makes reference to the accompanying drawings.

DETAILED DESCRIPTION OF THE PREFERRED EMBODIMENT

Figure 1:
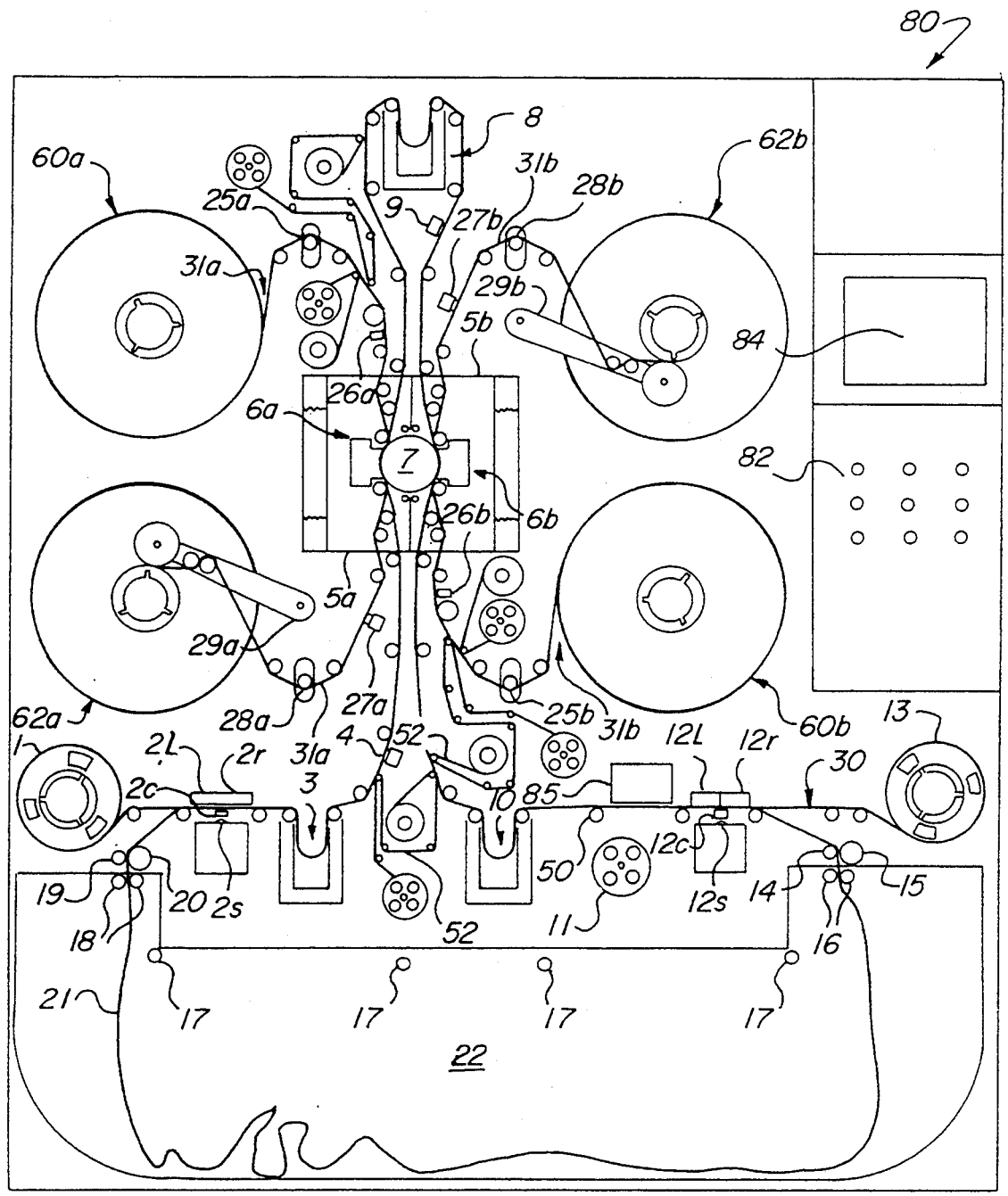
FIG. 1 shows a front view of the apparatus of the present invention with the plane of the containment bin on the same plane as the deck plates.

For purposes of illustration FIG. 1 discloses a master tape threaded for both shuttle and bin-loop modes of operation; in practice, however, only one of the two modes would be operative at a given time. In shuttle mode master tape 30 is drawn from supply reel 13 and collected onto take-up reel 1 during the duplication process. After duplication, it is rewound back onto supply reel 13, and a new cycle is commenced.

In bin-loop mode, the beginning and end of the master tape are spliced, forming a continuous loop. In this mode of operation, the master tape follows generally the same path through the duplicating mechanism as in shuttle mode, but excess master tape 21 when not active in the duplication process is held as multiple loops in containment bin 22. The master is forced into bin 22 by bin entrance capstan 19 and bin entrance pinch roller 20 through guides 18, and removed from bin 22 utilizing bin exit capstan 14 and bin exit pinch roller 15 through guides 16.

Regardless of master tape threading, the master tape enters area 12, which includes left and right hand splicer blocks 12L and 12R, respectively, cutter 12C and splicer 12S. From area 12, the master tape enters vacuum-operated tension regular 10, and is then guided up into the duplication area surrounding transfer drum 7. At various points along the path of the master tape and the copy tapes, numerous guides 50 are used to change tape direction, and wiping tapes 52 are used to clear debris from the master. It should be understood that the exact placement of the various components along the master-tape and copy-tape has is not essential to the present invention, and that guides, tension regulators, and wiping tapes may be included on an as needed basis or, in some cases removed due to space limitations.

The master tape follows a path contacting a portion of the right circumferential surface of transfer drum 7 and then is guided up into vacuum tension regulator 8 past cue-tone detecting magnetic head 9. The master tape then travels downwardly, contacting a portion of the left circumferential surface of drum 7, then continues downward past cue-tone detector 4 and into vacuum tension regulator 3.

From tension regulator 3, the master tape enters a take-up side area 2 containing left and right hand splicer blocks 2L and 2R, respectively, cutter 2C and splicer 2S. From this area 2, as mentioned previously, the master tape either travels to take-up reel 1 in shuttle mode or down into bin 22 in bin-loop mode.

In the preferred embodiment illustrated by FIG. 1, however, two copy tapes 31A and 31B are supplied on "pancakes" 60A and 60B. Each copy tape is threaded up into the transfer area proximate to drum 7 and onto take-up reels 62A and 62B. Arms 29A and 29B are utilized to ensure consistent tension and winding of the copy tapes onto their respective take-up reels after the duplication process.

As the duplication paths of each copy tape in the preferred embodiment are substantially similar, the explanation of only one path will be given. Copy tape 31A is drawn from pancake reel 60A over copy supply reel tension regulator 25A, past a wiping tape and automatic tape cutter 26A before entering the duplication area. The positioning of the copy tapes, and that of the master tape during duplication will be further explained with reference to FIGS. 2A and 2B.

Upon exiting the duplication area, copy tape 31A passes by control-track rerecord magnetic head 27A and copy tape take-up reel tension regulator 28A before being wound on take up reel 26A. Again, as mentioned, the path of copy tape 31B is very similar to that of 31A, except that the supply reel is necessarily below the take-up reel since master tape travel is upwardly against the right hand side of transfer drum 7 and downwardly against the left hand side of transfer drum 7 during the duplication process.

Attention is drawn to the fact that numerous operative components of the present invention are not evident from FIG. 1, as they reside behind the panel seen by the operator. Not shown are the motors used to drive transfer drum 7 and all of the reels and capstans; neither are the solenoids and other mechanical linkages associated with requisite translational movements shown or described in this or the other drawings.

The control section of the apparatus of the present invention is shown schematically in the upper right hand corner of FIG. 1 generally at 80. For most commands and operational modes, user inputs are received through control buttons 82, whereas responses, status and alert messages are displayed on cathode ray tube 84.

Figure 5:
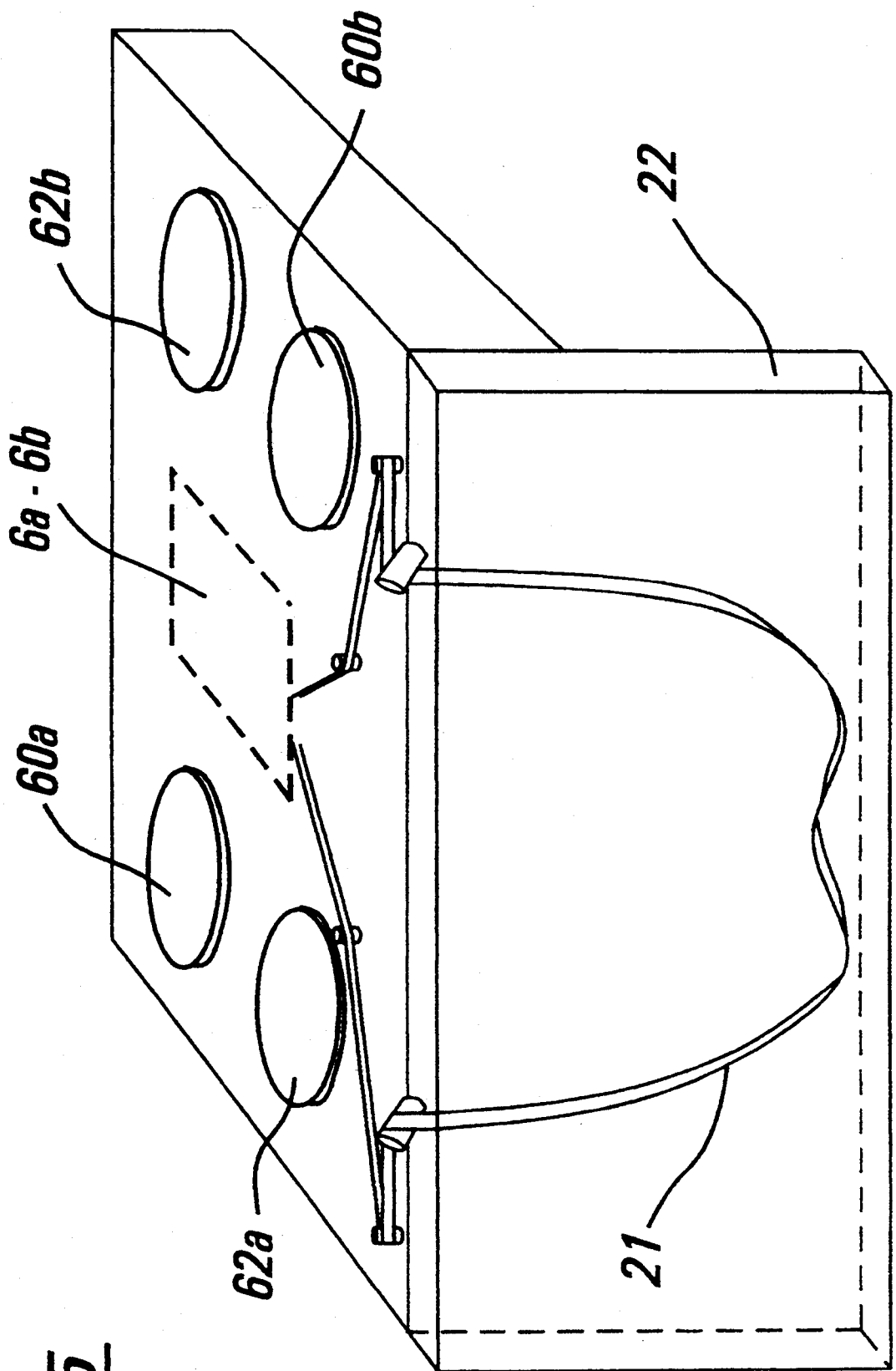
FIG. 5 is an oblique drawing which illustrates one configuration wherein the containment bin tape is perpendicular to that of the duplication apparatus.

Incidentally, it will be appreciated that the tape duplication section of the apparatus and containment bin 22 need not be manufactured into an integral unit, thereby allowing commercially available containment bins to be utilized with the duplication mechanisms of the present invention. Moreover, the containment bin need not be on the same general plane as the duplication panel; that is to say, bin 22 may be parallel to or perpendicular to the axis of transfer drum 7, depending upon space requirements (see FIG. 5). It is also contemplated that the control unit of the present invention need not be coresident with the duplication mechanisms and thus may be located remotely. In this case, a serial or parallel communication path could be provided, with information encoders and decoders located at both the duplication apparatus and in a separate operator area. Using commercially available modulator-demodulators, standard telephone lines may form part of the communication link.

Figure 4:
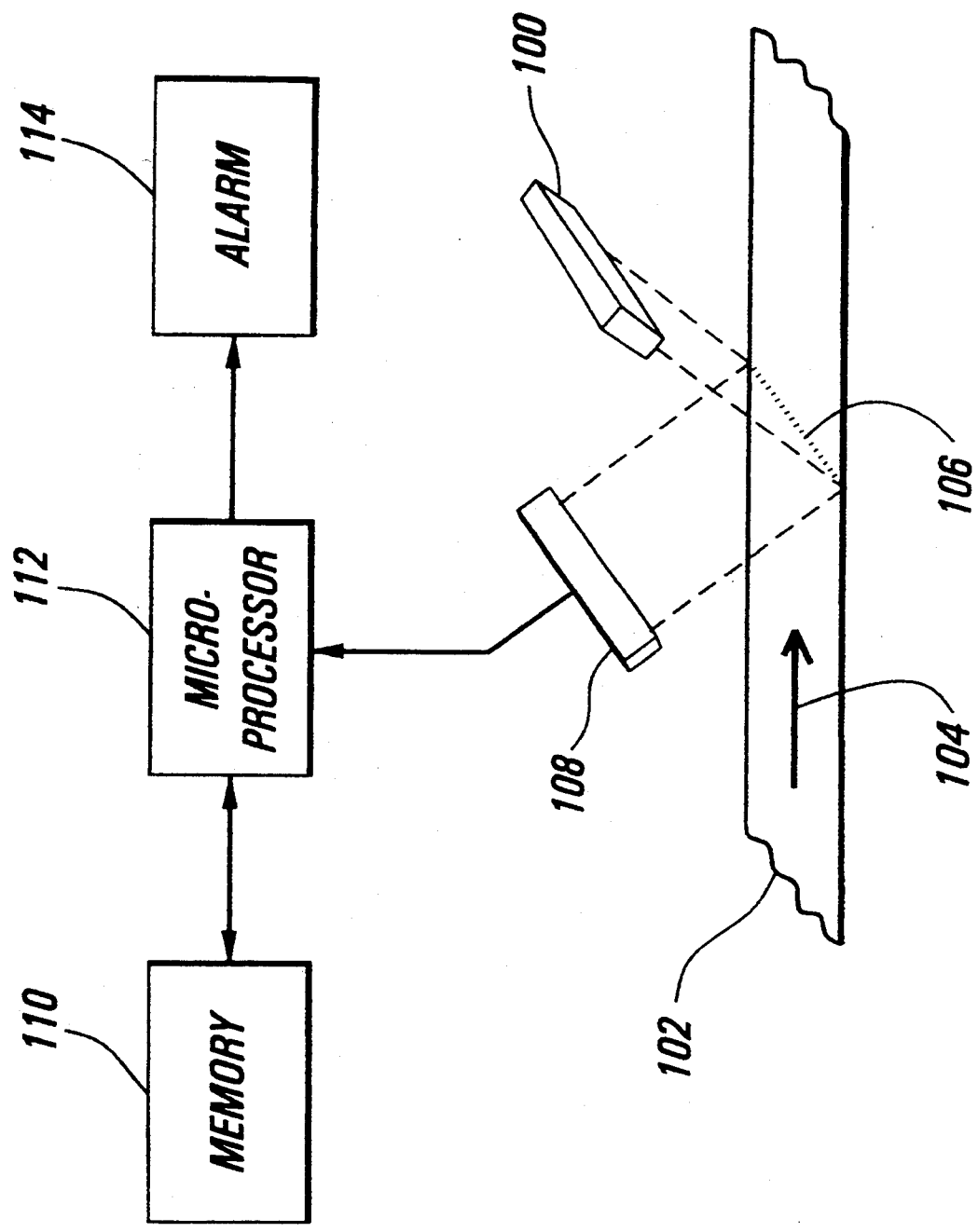
FIG. 4 shows the details of the master tape defect sensor assembly.

Provision is likewise made in the present invention for one or more sensors to locate physical defects in the master tapes, utilizing facilities such as those offered by Research Technology, Incorporated in their tape evaluator products. In a preferred embodiment shown as 85 in FIG. 1 and in detail in FIG. 4, the tape defect locator includes a sensor assembly shown generally at 85 positioned proximate to the surface of the master tape, operative to scrutinize the tape for physical defects. Preferably, a source of illumination 100 within the sensor assembly 85 is reflected from the surface of the master tape 102 and received by an in-line charge-coupled device-type sensor unit 108. The in-line sensor unit 108 is positioned perpendicular to the line of longitudinal tape travel 104 and continuously scrutinizes numerous points 106 along the width of the traveling tape by measuring the uniformity of the light reflected from the surface of the tape in the form of the electrical current generated by the various CCD receivers along the length of the sensor unit.

If the sensor discovers a defect as characterized by a disturbance or aberration in the uniformity of the reflected light, the position on the master tape, depending upon start time and tape travel speed, is stored by microprocessor 112 in memory. Each defect position is compared to previous defect positions as stored in the memory 110, and, if more than one master tape defect corresponding to a similar position on the master tape is discovered, it indicates a defective master tape, and the operator is alerted by an appropriate alarm 114.

Figure 2A:
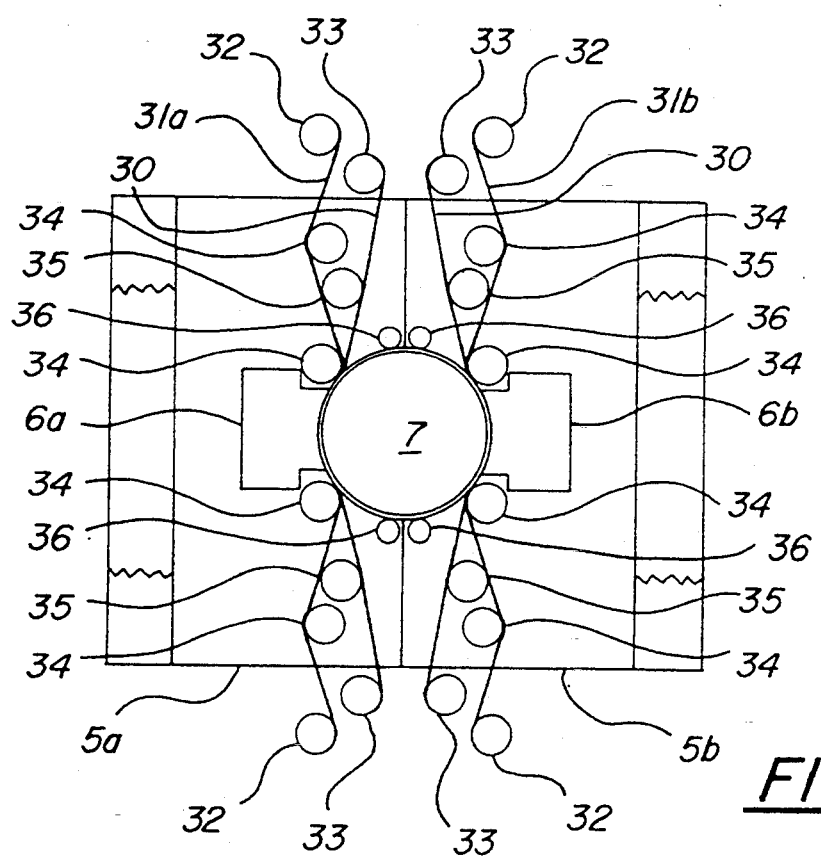
FIG. 2A shows a preferred dual transfer head mechanism of the present invention in run position.
Figure 2B:
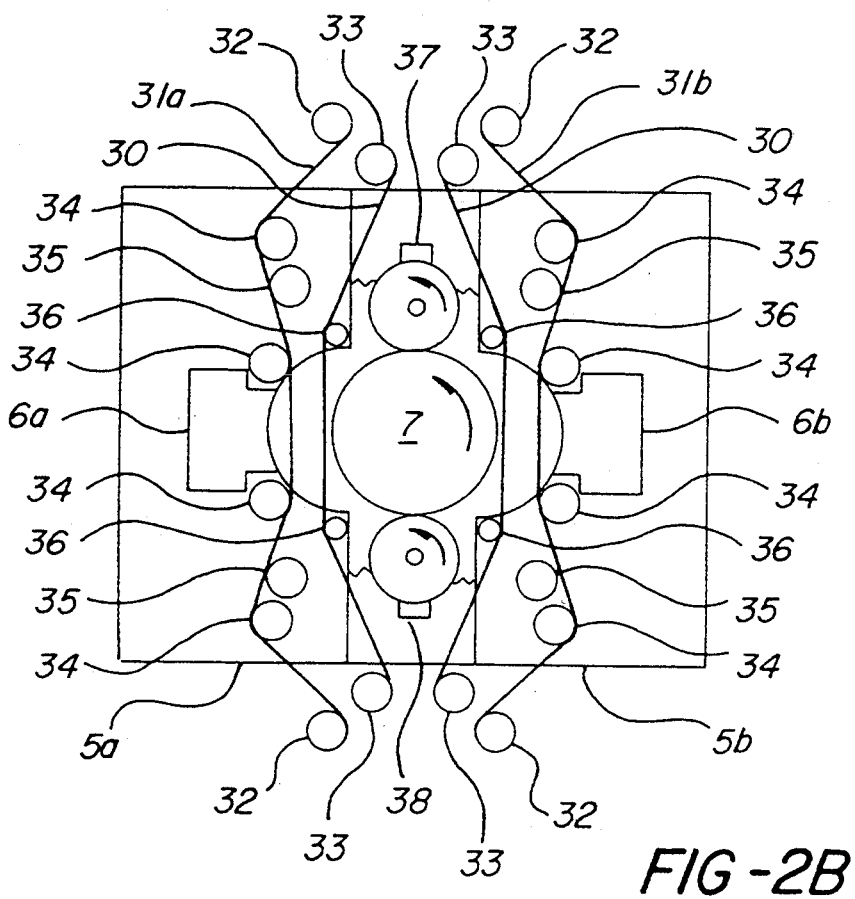
FIG. 2B shows the preferred dual transfer head mechanism in retracted position.

FIGS. 2A and 2B show the preferred dual-head transfer mechanism in the run and retracted positions. In the running position (that is utilized during tape duplication), deck plates 5A and 5B are translated inwardly toward transfer drum 7. The master tape is depicted at 30 and two copy tapes are depicted by 31A and 31B. In this running position, tape guides on deck plates 5A and 5B allow a portion of the master tape to wrap around both the right and left circumferential surfaces of transfer drum 7, and a portion of copy tape 31B to overlap in longitudinal conformance the section of master tape contacting the right side of the circumferential surface of transfer drum 7, and copy tape 31A to overlap in longitudinal conformance with the section of master tape contacting the left side of the circumferential surface of transfer drum 7. These tape sections are generally positioned by tape guides 34 on deck plates 5A and 5B, but additionally, air clamps in transfer heads 6A and 6B are used to force the copy tapes against the master tape and against transfer drum 7.

In the preferred embodiment, transfer head 6A and 6B provide bias magnetic fields, and transfer of the magnetization pattern from the master to the copies is carried out through the anhysteretic method. With this technique, the master must have a higher magnetic coercivity than the copy tapes, so that the master tape is able to retain its magnetization pattern in the presence of the bias magnetic fields, while the copy tapes, of lower coercivity, become demagnetized in the presence of the bias magnetic field and take on the magnetization pattern present in the master. To improve transfer efficiency and minimize debris, the master tape and copy tapes are held by the air clamps in bias heads 6A and 6B with their magnetic coatings face to face; that is, with the base material of the master away from the base material of the copies. It should be obvious that contact duplication, regardless of the effect utilized, requires the use of a "mirror master" to enable duplicate copies to be functional equivalents of an original master tape. Such mirror masters are generally known in the trade, and systems to produce mirror masters are commercially available.

The preferred embodiment of the present invention, as previously mentioned, is based upon anhysteretic magnetic tape duplication. Alternatively however the present invention could also make use of the thermal magnetic effect, whereby a magnetized object uses its magnetization if the temperature is elevated above its Curie point. In this alternative embodiment, transfer heads 6A and 6B would contain laser sources focussed to align perpendicular to the direction of tape travel and expose the copy tape against the master tape as transfer drum 7 rotates. A disadvantage of the thermal magnetic process is the requirement that the master tape be based upon a technology supporting a higher Curie temperature, such as high-coercivity metal-particle tapes; the copy tapes must have lower Curie temperature such as $CrO_2$.

As previously noted, the rotation of transfer drum 7 in the running position determines the duplication rate with the apparatus of the present invention. As drum 7 rotates, master tape 30 is pulled through the mechanism and each copy tape is pulled along and past its respective transfer head due to the pressurization of the copy tape against the master tape and against drum 7 by the air clamps. Other rotational motors such as those provided for the copy pancakes and the master tape reels in shuttle mode, are servo-controlled to serve the tape requirements demanded by the rotation of drum 7.

FIG. 2B illustrates the preferred dual head transfer mechanism of the present invention in its retracted position. In this case, tape guides 36 hold master tape 30 away from transfer drum 7 and tape guides 34 and 35 hold copy tapes 31A and 31B away from the master tape and transfer heads 6. This facilitates rewind of the master tape in shuttle modes. With deck plates 5A and 5B translated away from transfer drum 7, cleaning rollers 37 and 38 may be brought from their previously retracted position into the cleaning position shown in the figure. Preferably, two rollers are used, each having a cylindrical side wall covered with an absorbent material.

During transfer drum cleaning, one edge of each roller is operatively engaged to a different point along the cylindrical side wall of drum 7, in the case shown, being on opposite sides. One of rollers 37 and 38 is preferably moistened with a cleaning solution and the other roller functions to dry the drum after receiving this solution. As shown in the figure, both rollers and the drum are rotated in the same direction during the cleaning operation, so that at the contact points the surfaces move in opposite directions to enhance the cleaning process.

Figure 3A:
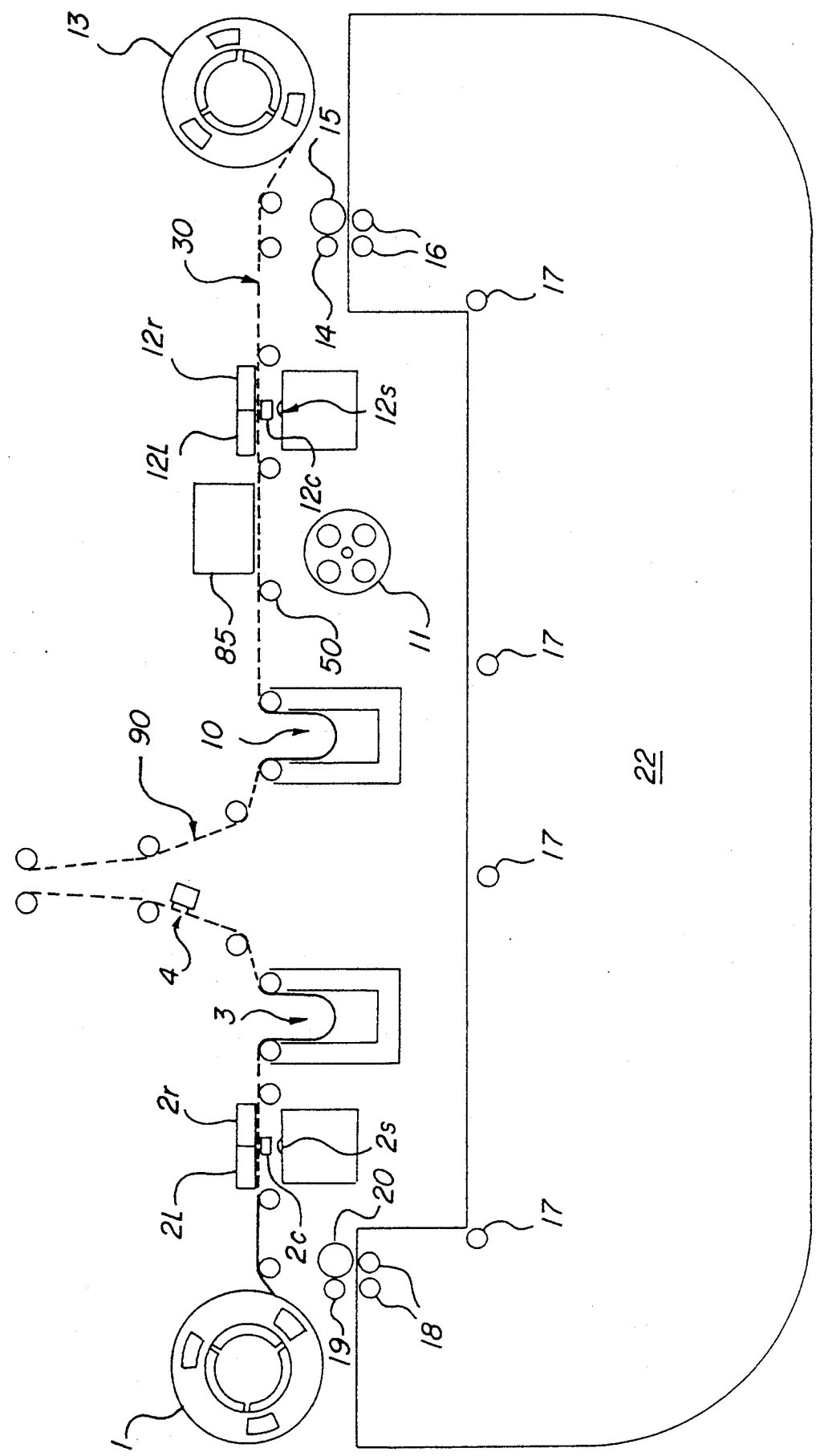
FIGS. 3A–3F illustrate some of the steps of the automatic master-tape threading method of the present invention.
Figure 3B:
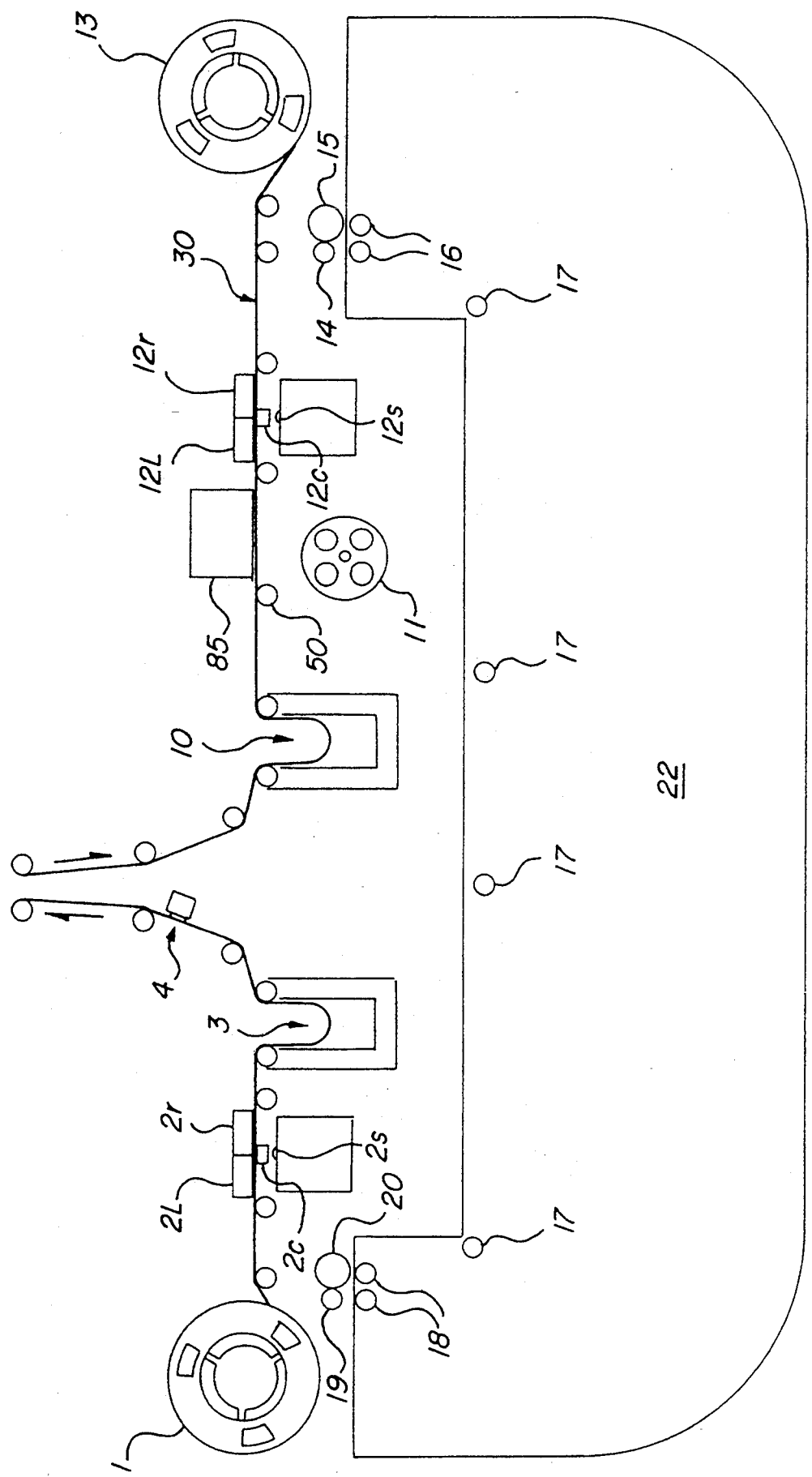
Figure 3C:
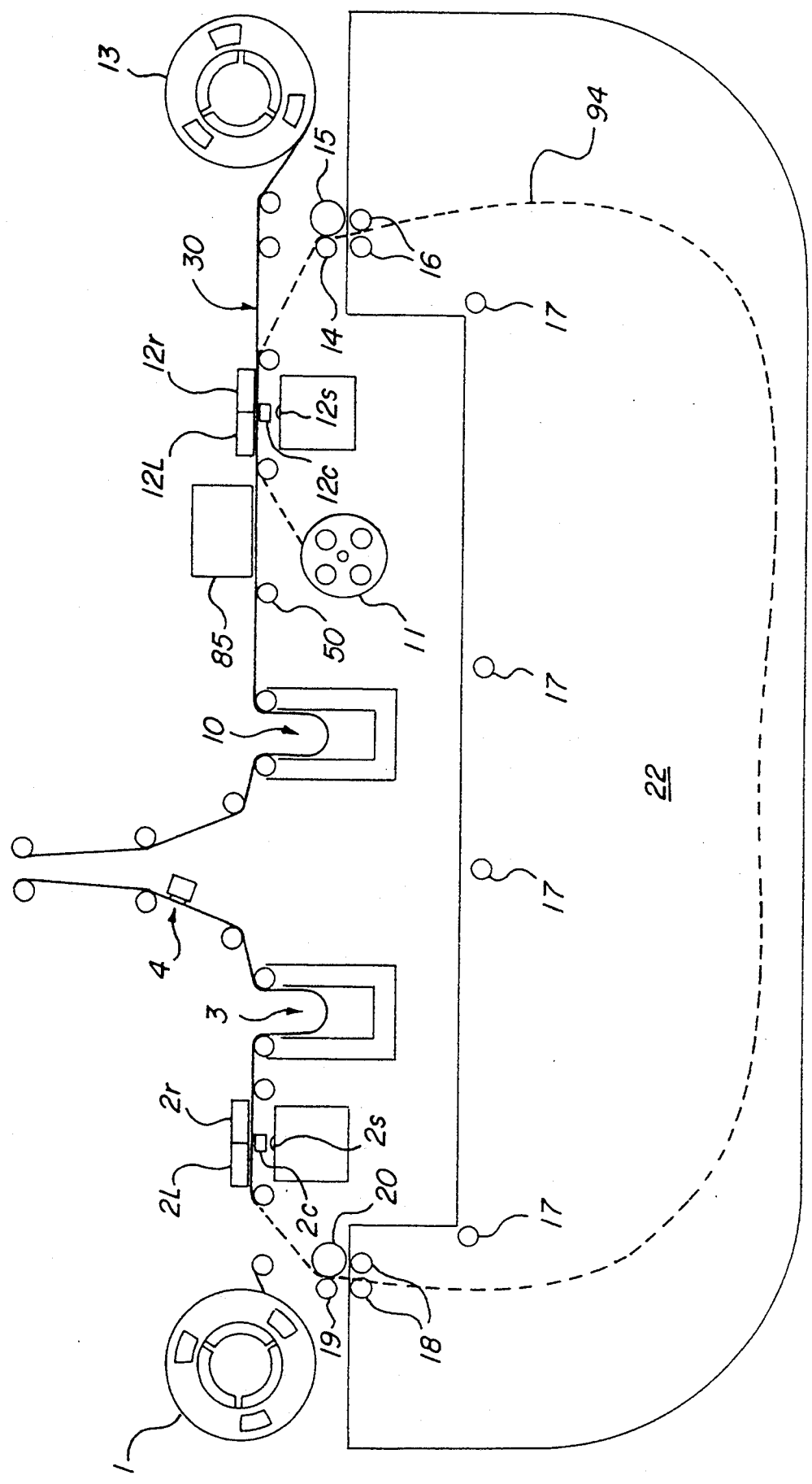

The method of the present invention requires means whereby the master tape may be threaded through the mechanism automatically to effectuate either the shuttle mode or the bin-loop mode of operation. Turning attention then to FIG. 3, FIGS. 3A and 3B show how a master is automatically threaded for shuttle mode, whereas FIGS. 3C through 3F illustrate the additional steps necessary to automatically thread the apparatus for the bin-loop mode. Beginning with FIG. 3A, then, a transport leader 90 is provided on reel 13 and threaded manually up and around transfer drum 7 (not shown), and spliced to the free end 92 of the master tape provided on take-up reel 1. For the sake of clarity, numerous sections of the overall duplicating apparatus are not shown, including the deck plates, master-tape regulators, and mechanisms associated with the copy tapes. It should also be recognized that tape cuttings and splicings made on the take-up or left hand side of the apparatus are carried out in area 2 of FIG. 1, including cutter 2C and splicer 2S, and that tape cutting and splicings on the right hand or supply area of the apparatus are carried out in area 12 of FIG. 1, including cutter 12C and splicer 12S.

When a reel is darkened as in the take-up reel in FIG. 3A and the supply reel in FIG. 3B, such darkening is used to indicate where the majority of the master tape resides, unless it resides in containment bin 22, as will be seen in subsequent parts of FIG. 3.

Turning now to FIG. 3B, having spliced transport leader 90 onto the loose end of the master tape, supply reel 13 is rotated, drawing the leader and the master tape attached thereto through the duplicating apparatus, past the transfer heads, and onto supply reel 13. As indicated with the arrows in FIG. 3B the master tape is wound onto the supply reel until a Q-tone detector such as 4 and 9 in FIG. 1 recognizes the front end of the master tape.

If the apparatus is to be operated in the shuttle mode, no further steps are necessary, as the master tape may now be shuttled back and forth between take-up reel 1 and supply reel 13 during copy tape duplication. When the end of the master is reached, deck plates 5A and 5B may be retracted and the master tape rewound onto supply reel 13 for subsequent duplication cycles. While deck plates 5A and 5B are retracted the previously described transfer drum cleaning process may commence.

Figure 3D:
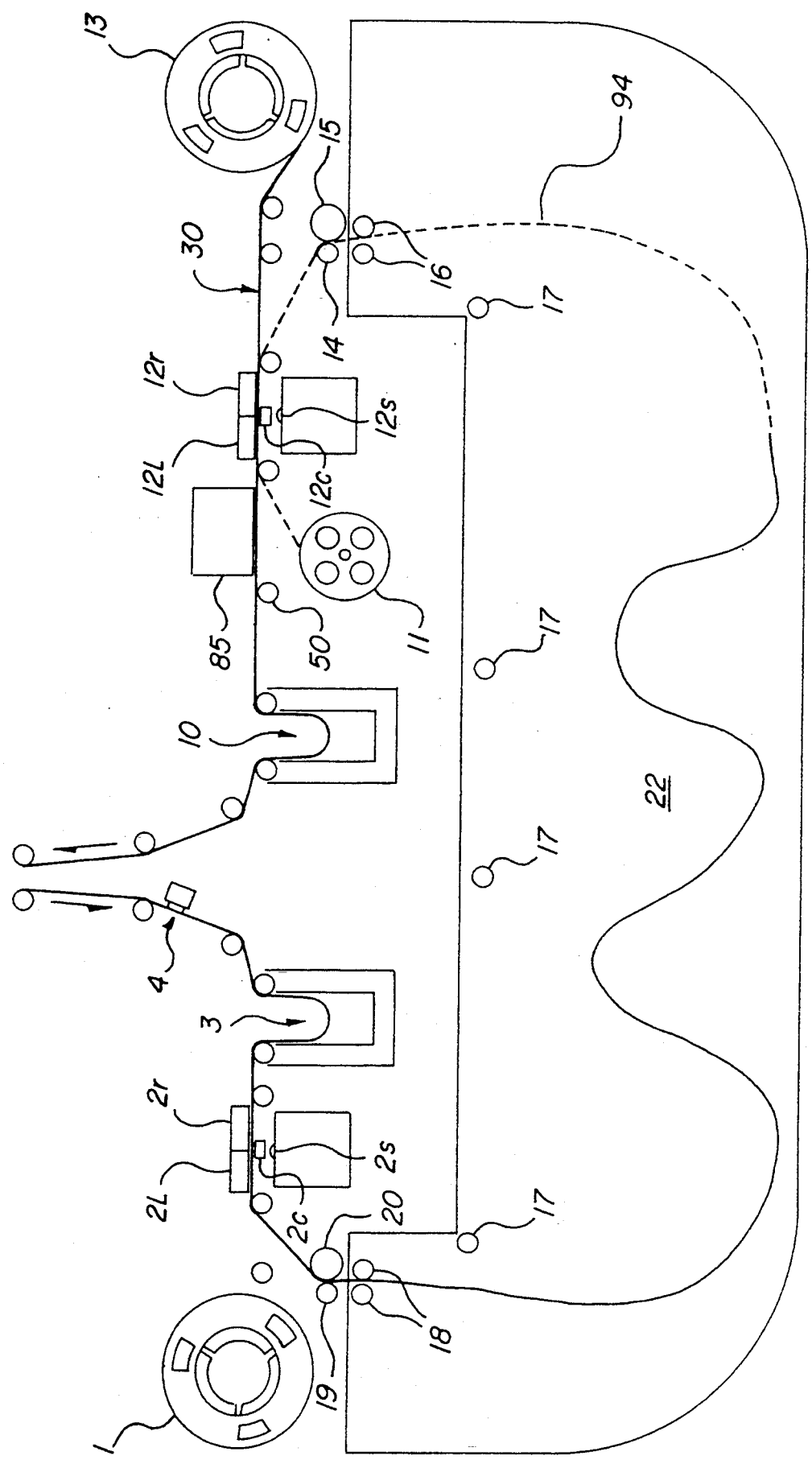
Figure 3E:
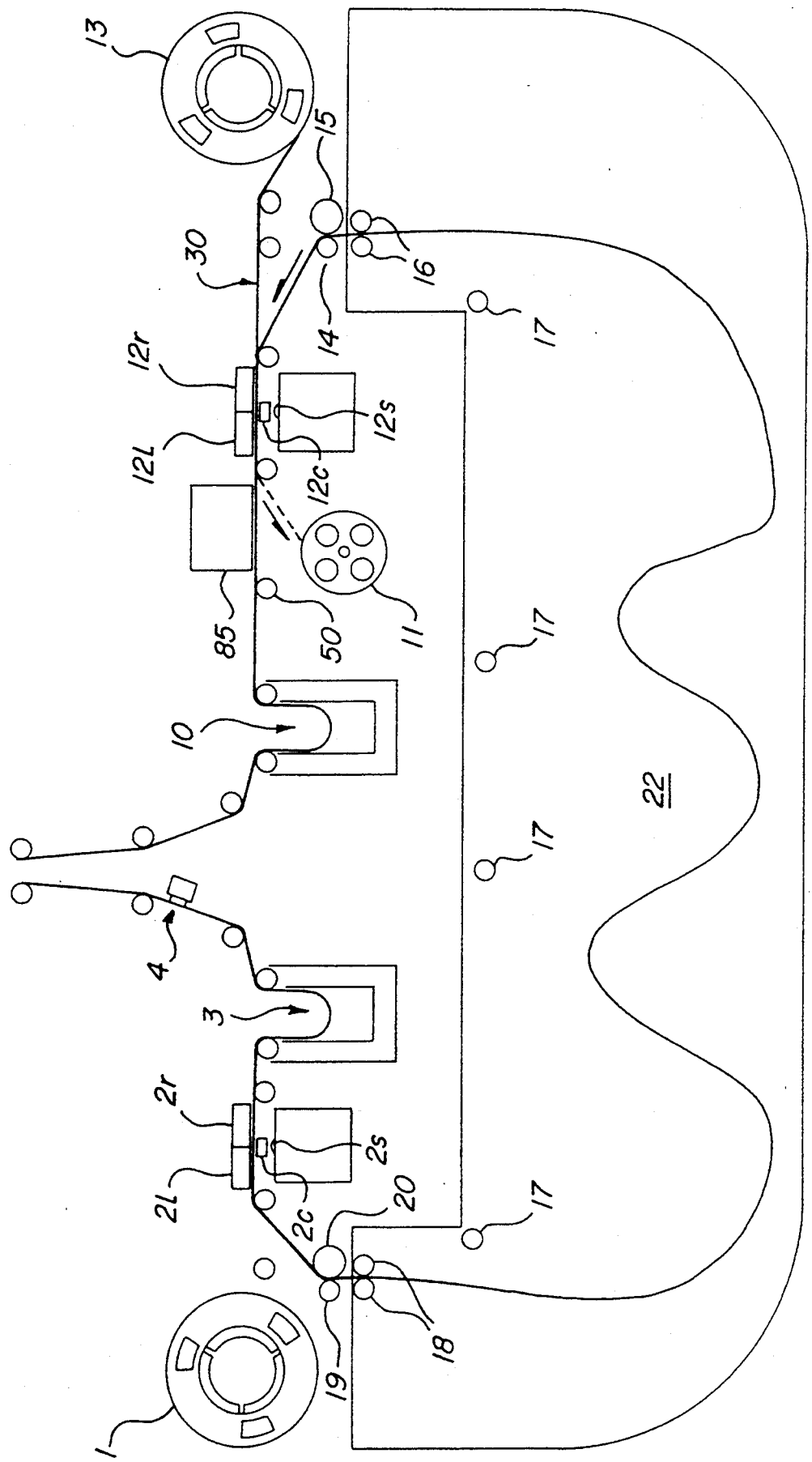
Figure 3F:
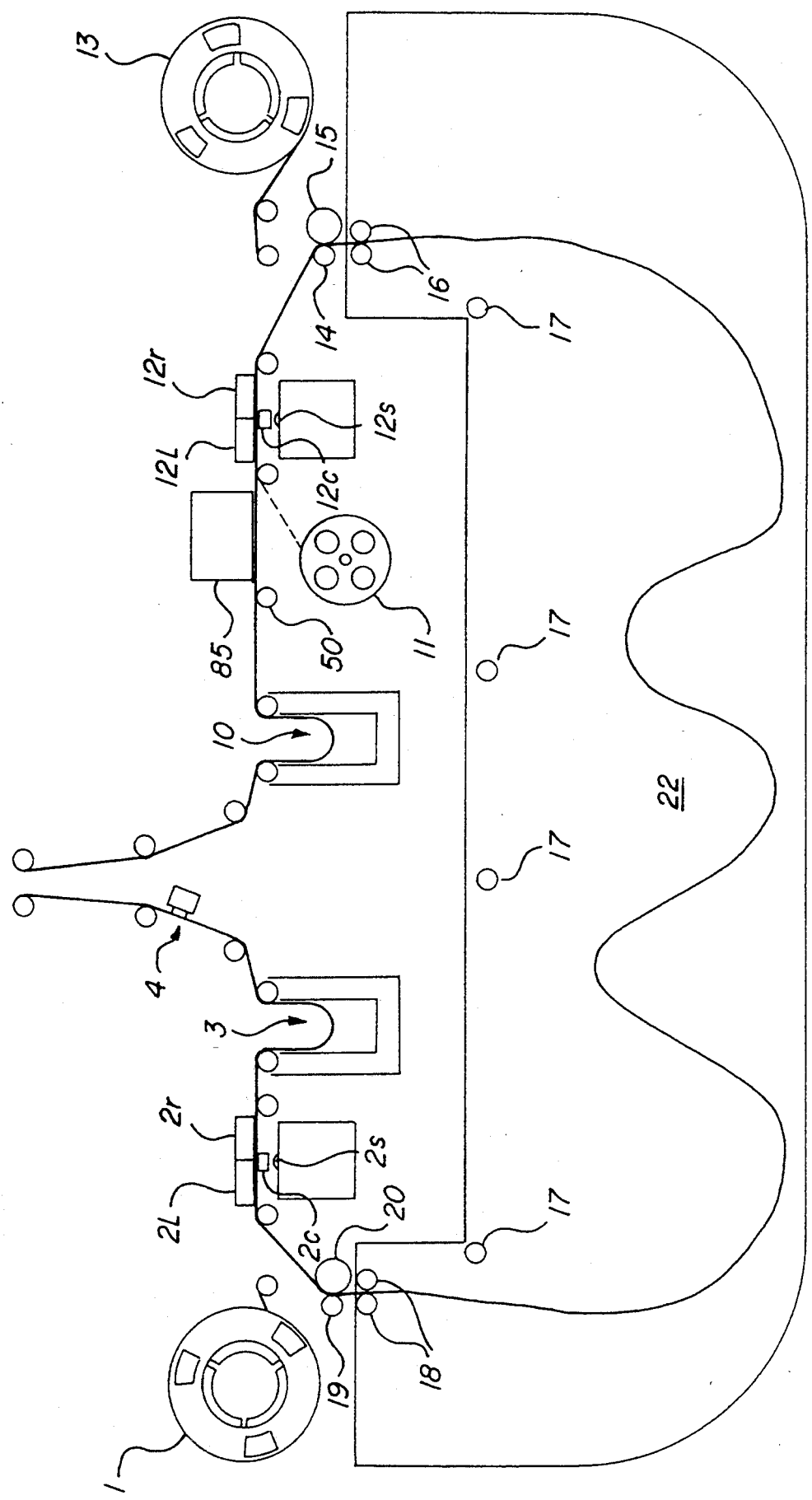

If the bin-loop mode is desired, a bin-loop leader 94 is drawn from bin-leader supply reel 11 through capstan 14 and pinch roller 15 and past guides 16 into containment bin 22. From there, the bin leader is drawn up through guides 18 and past capstan 19 and pinch roller 20 where it is spliced to the front portion of the master tape having been cut from reel 1. Now, as shown in FIG. 3D, capstan 19 is rotated against pinch roller 20 drawing the master tape from supply reel 13 as indicated by the arrows in 3D, and into containment bin 22 where it takes on a series of folded loops, as shown in the figure. This process is continued until the end of the master tape is recognized by one of the cue-tone sensors. Meanwhile, excess bin leader tape previously contained in bin 22 is rewound onto reel 11 as shown in FIG. 3 until the front end of the master tape becomes proximate to capstan 14 and pinch roller 15. At this point, the front and tail end of the master tape are in close proximity, and by cutting the bin leader the two ends of the master tape may be spliced as shown in FIG. 3F, forming a continuous loop. This completes the threading of the master tape for the bin-loop operational mode, as the master may now be drawn from containment bin 22 using capstan 14 and pinch roller 15 into and past the transfer drum and transfer heads, and back down into bin 22 using capstan 19 and pinch roller 20.

Having thus described my invention I claim:

1. An apparatus for producing a plurality of magnetic copy tapes simultaneously from a magnetic master tape, the apparatus comprising:
   a transfer drum having a cylindrical sidewall, said drum being rotatable about a fixed non-translatable axis;
   a movable deck plate associated with each copy tape, each deck plate comprising:
   a transfer head,
   a first set of master tape guides,
   a second set of master tape guides,
   a set of copy tape guides,
   a set of guides common to both master and copy tapes, and
   an air clamp assembly,
   each plate being movable between a retracted position wherein said master tape and said copy tape are held spaced apart from each other and away from said transfer drum by said first set of said master tape guides and said copy tape guides, and a run position wherein said second set of master tape guides and said common guides are used to position a longitudinal section of said copy tape against a longitudinal section of said master tape, said overlapping master and copy tape sections further being urged against at least a portion of said transfer drum sidewall using said air clamp to ensure an intimate and substantially slip-free contact therebetween;
   a copy-tape transport mechanism associated with each copy tape, said mechanism being operative to supply and collect said copy tapes as said transfer drum rotates;
   a master-tape transport mechanism operative to supply and collect said master as said transfer drum rotates; and
   a control unit operative to enable a user of said apparatus to monitor and control said apparatus.

2. The apparatus of claim 1 wherein said transfer head is a bias-field magnetic transfer head.

3. The apparatus of claim 1 wherein said transfer head is a thermal magnetic head.

4. The apparatus of claim 1 wherein said master and said copy tapes are composed of a base strip coated with a magnetic material facing and each face of said copy is urged against the face of said master by said air clamp.

5. The apparatus of claim 1 wherein said containment bin is provided as a detachable unit.

6. The apparatus of claim 1 wherein a line perpendicular to the longitudinal direction of said master tape in said containment bin is substantially parallel to said transfer drum axis.

7. The apparatus of claim 1 wherein a line perpendicular to the longitudinal direction of said master tape in said containment bin is substantially perpendicular to said transfer drum axis.

8. The apparatus of claim 1 further including a transfer-drum cleaner comprising at least two rollers having sidewalls covered with an absorbent material, each said roller being movable between a retracted position when said deck plates are in said run position and a cleaning position when said deck plates are retracted wherein each said roller sidewall is urged against a different portion of said transfer drum sidewall and rotated in the same direction as said drum.

9. The apparatus of claim 8 wherein at least one of said roller surfaces is adapted to receive a cleaning solution.

10. The apparatus of claim 9 further including a vacuum to collect vapors and contaminants generated by said transfer-drum cleaner.

11. The apparatus of claim 1 wherein said master-tape transport mechanism includes a plurality of tension regulators.

12. The apparatus of claim 1 further including a master tape defect locator, including:
   a sensor positioned proximate to the surface of said master tape, said sensor being operative to detect physical defects thereon;
   a controller in electrical communication with said sensor and with a memory unit, the controller operative to:
   compute the relative position on said master corresponding to the position of said defect on said master tape;
   store in said memory signals representative of said master tape position;
   compare said positions with signals representative of positions corresponding to previously detected defects in said master; and
   alert the operator of said apparatus when two or more defects in said master correspond to substantially the same position on said master.

13. The apparatus of claim 1 further including a two-way communication link operative to enable said user to monitor and control said apparatus from a location remote to said apparatus.

14. The apparatus of claim 1, wherein each deck plate is movable through translation along the line extending radially outward from said transfer drum.

15. The apparatus of claim 1, wherein said master tape transport mechanism is adapted to function either in a shuttle mode wherein said master is shuttled between a supply reel and a take-up reel or a bin-loop mode, wherein said master is provided as an endless loop and cycled through a containment bin.

16. A method of producing a plurality of magnetic copy tapes simultaneously from a magnetic master tape, comprising the steps of:
   providing a master tape and a plurality of copy tapes said master tape having a magnetically encoded mirror image of the pattern desired to be transferred to each of said copy tapes;
   wrapping at least one longitudinal section of said master tape around at least a portion of the cylindrical sidewall of a single transfer drum rotatably driven about a fixed non-translatable axis;
   urging a section of each copy tape into overlapping longitudinal conformance with a different portion of a master tape section contacting said drum sidewall;
   applying transfer energization to at least a portion of each copy tape section where overlapped with said master;
   rotating said transfer drum to draw said master tape and each of said copy tapes simultaneously through said transfer energization; and
   controlling the tension of said master tape between each point where said master tape contacts said transfer drum sidewall.

17. The method of claim 16 wherein said transfer energization is a bias magnetic field.

18. The method of claim 14 wherein said transfer energization is heat.

19. The method of claim 16 wherein said master and said copy tapes are 0.5-inch video tapes.

20. The method of claim 16 wherein said master and said copy tapes are 8-mm video tapes.

21. The method of claim 16 wherein said master and said copy tapes are VHS video tapes.

22. The method of claim 16 further including the automatic threading of said master tape to effectuate a shuttle mode of operation, including the steps of:
   providing a transport leader tape wound on a supply reel;
   providing a master tape with a front end and a tail end, said master tape being wound on a take-up reel with said tail end out;
   splicing said tail end of said master tape onto said transport leader tape;
   threading said transport leader tape through the path taken by said master tape; and
   winding onto said supply reel said transport leader tape with said master tape spliced thereunto until reaching said master front end.

23. The method of claim 22 further including the automatic threading of said master to effectuate a bin-loop mode of operation, adding the steps of:
   providing a master tape containment bin;
   providing a bin leader tape wound on a bin leader supply reel;
   threading said bin leader through said containment bin;
   splicing said bin leader to said master front end;
   unwinding said master from said supply reel and into said bin until said tail end is reached;
   winding said bin leader tape onto said bin leader supply reel until said master tape front end is reached; and
   splicing said master tail end and said front end to form a continuous loop.

24. A method of producing a plurality of copy tapes simultaneously from a master tape operating in a shuttle mode, comprising the steps of:
   providing a plurality of copy tapes;
   providing a transport leader wound on a supply reel;
   providing a master tape with a front end and a tail end, said master tape being wound on a take-up reel with said tail end out;
   splicing said tail end of said master onto said transport leader;
   threading said transport leader, including the step of wrapping at least one longitudinal section of said leader around at least a portion of the cylindrical sidewall of transfer drum rotatable about a fixed axis;
   winding onto said supply reel said transport leader with said master tape spliced thereto until said master front end is reached;
   overlapping and urging in longitudinal conformance a section of each copy tape against at least a portion of master tape section contacting said drum sidewall;

applying a bias magnetic field to at least a portion of each copy tape section where overlapped and urged against said master;

rotating said transfer drum to draw said master tape and said copy tapes through said bias magnetic field and controlling the tension of said master tame between each longitudinal section having a copy tape overlapping thereagainst.

25. A method of producing a plurality of copy tapes simultaneously from a master tape operating in a bin-loop mode, comprising the steps of:

providing a plurality of copy tapes;

providing a transport leader wound on a supply reel;

providing a master tape with a front end and a tail end, said master tape being wound on a take-up reel with said tail end out;

splicing said tail end of said master onto said transport leader;

threading said transport leader through a duplicating apparatus, including the step of wrapping at least one longitudinal section of said leader around at least a portion of the cylindrical sidewall of transfer drum rotatable about a fixed axis;

winding onto said supply reel said transport leader with said master tape spliced thereto until said master front end is reached;

providing a master tape containment bin;

providing a bin leader tape wound on a bin leader supply reel;

threading said bin leader through said containment bin;

splicing said bin leader to said master front end;

unwinding said master from said supply reel and into said bin until said tail end is reached;

winding said bin leader tape onto said bin leader supply reel until said master tape front end is reached;

splicing said master tail end and said front end to form a continuous loop;

overlapping and urging in longitudinal conformance a section of each copy tape against at least a portion of a master tape section contacting said drum sidewall;

applying a bias magnetic field to at least a portion of each copy tape section where overlapped and urged against said master;

rotating said transfer drum to draw said master tape and said copy tapes through said bias magnetic field; and controlling the tension of said master tape between each longitudinal section having a copy tape overlapping thereagainst.

* * * * *

UNITED STATES PATENT AND TRADEMARK OFFICE
CERTIFICATE OF CORRECTION

PATENT NO. : 5,450,247
DATED : September 12, 1995
INVENTOR(S) : Barry H. Schwab, Kinya Washino It is certified that error appears in the above-indentified patent and that said Letters Patent is hereby corrected as shown below:

On title page, item [75] Inventor: Please add --Kinya Washino, Mahwah, New Jersey.--

Column 11, line 1: Insert --a-- after "of".

Column 11, line 8: Insert --;-- after "field".

Column 11, line 9: Replace "tame" with --tape--.

Signed and Sealed this

Twelfth Day of December, 1995

Attest:

BRUCE LEHMAN

*Attesting Officer*

*Commissioner of Patents and Trademarks*